United States Patent [19]

Grossman et al.

[11] 4,200,460

[45] Apr. 29, 1980

[54] ALLOYS FOR GETTERING MOISTURE AND REACTIVE GASES

[75] Inventors: Leonard N. Grossman, Livermore; Douglas R. Packard, Sunol, both of Calif.

[73] Assignee: General Electric Company, San Jose, Calif.

[21] Appl. No.: 510,299

[22] Filed: Sep. 30, 1974

Related U.S. Application Data

[63] Continuation of Ser. No. 74,471, Sep. 22, 1970, abandoned.

[51] Int. Cl.$^2$ .............................................. C22C 16/00
[52] U.S. Cl. .................................... 75/177; 176/91 R
[58] Field of Search ................. 75/177; 23/2; 316/25; 252/181.1, 181.6; 417/48; 176/91 R

[56] References Cited

U.S. PATENT DOCUMENTS

| | | | |
|---|---|---|---|
| 1,151,160 | 8/1915 | Brown | 75/177 |
| 2,926,981 | 3/1960 | Stout et al. | 75/177 |

FOREIGN PATENT DOCUMENTS

138348  4/1921  United Kingdom ...................... 75/177

OTHER PUBLICATIONS

Nuclear Sci. Abstracts, vol. 22, #11, Jun. 15, 1968, No. 21659.
Nuclear Sci. Abstracts, vol. 24. #16, Aug. 31, 1970, No. 32345.
Nuclear Sci. Abstracts, vol. 19, #13, Jul. 15, 1965, No. 24982.
Nuclear Sci. Abstracts, vol. 19, #17, Sep. 15, 1965, No. 32696.

*Primary Examiner*—L. Dewayne Rutledge
*Assistant Examiner*—Peter K. Skiff
*Attorney, Agent, or Firm*—Ivor J. James, Jr.; Samuel E. Turner; Sam E. Laub

[57] ABSTRACT

Alloys reacting with water, water vapor and reactive gases at temperatures in the range of about 200° to about 650° C. have the essential components of nickel, titanium and zirconium. The alloys can be made by arc melting zirconium, nickel and titanium and can be formed into sheet or foil by inert-atmosphere hot rolling. The alloys can also be made by plating nickel on a sheet of zirconium-titanium alloy and then conducting a diffusion process by heating the plated alloy in vacuum.

2 Claims, No Drawings

ALLOYS FOR GETTERING MOISTURE AND REACTIVE GASES

REFERENCE TO RELATED APPLICATION

This is a continuation of application Ser. No. 74,471, filed Sept. 22, 1970 now abandoned.

BACKGROUND OF THE INVENTION

This invention relates to a class of alloys acting as moisture and gas getters, and it relates more particularly to a class of alloys having the property of reacting with moisture and gases generated inside enclosed regions at elevated temperatures.

Nuclear reactors are presently being designed, constructed and operated in which the nuclear fuel is contained in fuel elements which may have various geometric shapes, such as plates, tubes, or rods. The fuel material is usually enclosed in a corrosion-resistant, non-reactive, heat conductive container or cladding. The elements are assembled together in a lattice at fixed distances from each other in a coolant flow channel or region forming a fuel assembly, and sufficient fuel assemblies are combined to form the nuclear fission chain reacting assembly or reactor core capable of a self-sustained fission reaction. The core in turn is enclosed within a reactor vessel through which a coolant is passed.

The cladding serves two primary purposes: first, to prevent contact and chemical reactions between the nuclear fuel and either the coolant or moderator if present, or both; and second, to prevent the highly radioactive fission products, some of which are gases, from being released from the fuel into the coolant or moderator or both. Common cladding materials are stainless steel, aluminum and its alloy, zirconium and its alloys, niobium (columbium), certain magnesium alloys, and others. The failure of the cladding, due to the build-up of gas pressure or high temperatures in the fuel, can contaminate the coolant or moderator and the associated systems with intensely radioactive long-lived products to a degree which interferes with plant operation.

Problems have been encountered in the manufacture and in the operation of nuclear fuel elements which employ certain metals and alloys as the clad material due to the reactivity of these materials under certain circumstances. Zirconium and its alloys, under normal circumstances, are excellent materials as a nuclear fuel cladding since they have low neutron absorption cross sections and at temperatures below about 600° F. are extremely stable and non-reactive in the presence of demineralized water or steam which are commonly used as reactor coolants and moderators. Within the confines of a sealed fuel rod, however, the hydrogen gas generated by the slow reaction between the cladding and residual water may build up to levels which under certain conditions can result in localized hydriding of the alloy with concurrent deterioration in the mechanical properties of the alloy. The cladding is also adversely affected by such gases as oxygen, nitrogen, carbon monoxide and carbon dioxide at all reactor operating temperatures.

The zirconium alloy cladding of a nuclear fuel element is exposed to one or more of the gases given above during irradiation in a nuclear reactor in spite of the fact that these gases may not be present in the reactor coolant or moderator, and further may have been excluded as far as possible from the ambient atmosphere during manufacture of the cladding and the fuel element. Sintered refractory and ceramic compositions, such as uranium dioxide and others used as nuclear fuel, release measurable quantities of the aforementioned gases upon heating, such as during fuel element manufacture or especially during irradiation. These gases react with zirconium alloy clad material containing the nuclear fuel. This reaction can result in the embrittlement of the cladding which endangers the integrity of the fuel element. Although water and water vapor may not react directly to produce this result, at high temperatures water vapor does react with zirconium and zirconium alloys to produce hydrogen and this gas further reacts locally with the zirconium and zirconium alloys to cause embrittlement. These undesirable results are exaggerated by the release of these residual gases within the sealed metal-clad fuel element since it increases the internal pressure within the element and thus introduces stresses not anticipated in the original design of the clad tube.

In light of the foregoing, it has been desirable to eliminate water, water vapor and gases reactive with the cladding from the interior of the cladding throughout the time the nuclear fuel is used in the operation of nuclear power plants. One such approach has been to find materials which will chemically react with the water, water vapor and gases to eliminate these from the interior of the cladding, which materials are called getters. While several getters for water and water vapor have been found, such as the zirconium-titanium getter set forth in U.S. Pat. No. 2,926,981, it has remained desirable to develop a getter having equal or even greater rapidity of reaction with moisture and gases, and having the additional feature of producing negligible hydrogen gas during the reaction with moisture.

SUMMARY OF THE INVENTION

It has now been found that all of the aforementioned problems encountered with moisture and gases in nuclear fuel elements clad with zirconium, aluminum, niobium and their alloys and stainless steels can be overcome by utilizing, in the volume enclosed by the fuel element cladding, a class of alloys having the essential components of nickel, titanium and zirconium.

It is an object of this invention to provide a material capable of rapid reaction with water and water vapor generated at elevated temperatures so that any corrosive effects of the water or water vapor are eliminated.

It is another object of this invention to control the moisture content in clad nuclear fuel assemblies during utilization of these assemblies in nuclear reactors at high temperatures.

It is another object of this invention to provide a three component alloy which is a getter for water, water vapor and reactive gases.

Another object of this invention is to provide a material suitable as a getter for vacuum system application to protect the vacuum from release of gases such as hydrogen, oxygen, water vapor and other gases.

Still another object of this invention is to provide a material for nonnuclear uses capable of serving as a scavenger for cleaning inert gases by removing gaseous impurities through a chemical reaction between the material and the gases to be removed from the inert gases.

A still further object of this invention is to fabricate a material capable of serving as a getter which reacts substantially stoichiometrically with water so that the gettering reaction does not produce a source of hydrogen.

The foregoing and other objects of this invention will become apparent to a person skilled in the art from reading the following specification and the appended claims.

DETAILED DESCRIPTION OF THE INVENTION

It has been discovered that a material suitable for controlling moisture by chemically combining with water and water vapor, herein called a getter, should have a combination of properties. One desirable property is the minimization of any free hydrogen after the chemical reaction of the getter with water to prevent hydride failures of metal components associated with the getter. Thus the getter should react stoichiometrically with the water and water vapor (both herein called water source) and in such a way that there is no net source of hydrogen from the reaction. The getter should also rapidly react with the water source at the temperatures prevailing in the system in which the getter is utilized, which would be in the range of about 200 to about 650° C. for a preferred application of the getter in clad nuclear fuels. The getter should also have a low neutron cross section and be inexpensive to fabricate. Preferably the getter should also have the property of reacting with hydrogen, other reactive gases such as carbon monoxide, carbon dioxide, oxygen and nitrogen, and hydrogen-containing compounds such as hydrocarbons.

The foregoing properties are embodied in a class of alloys having the essential components zirconium, nickel and titanium, particularly those alloys continuing from about 3 to about 12 weight percent nickel, from about 3 to about 30 weight percent titanium with the balance being zirconium. The alloys can be classified as zirconium base alloys and the composition ranges given above with one desirable fabrication history such as disclosed hereinafter to produce alloys having at least about 0.5 volume percent of an intermetallic nickel-containing phase. Representative of the intermetallic nickel-containing phases in the alloy are $NiZr_2$ and $Ni(0.9Zr, 0.1Ti)_2$. The alloys have a metallic appearance and metallographic examination shows the alloys are medium grained having an average grain size of about 10 millimicrons.

The impurity content of the alloys is not critical to the development of the foregoing getter properties and substantial amounts of impurities can be included in the fabricated alloys as long as the surface of the alloys has the zirconium-nickel-titanium ternary exposed for reaction. In practice it has been discovered that oxygen contents up to several thousand parts per million in the alloys are tolerable. Nitrogen contents up to about 750 parts per million are tolerable and even desirable in utilization of the alloys as moisture getters. The other impurities found in the ternary alloys of this invention which do not hinder use of the alloys as getters include hydrogen and carbon. Metallic impurities in the alloy which do not hinder use of the alloys as getters are hafnium in amounts up to about 10,000 parts per million, iron in amounts up to about 1100 parts per million and chromium in amounts up to about 1000 parts per million. The fact that the impurity content of the alloys is not critical to the utilization of the alloys as moisture getters enables fabrication of the alloy from low-grade components of nickel, titanium and zirconium having impurity contents. An example would be using impure zirconium available from a zirconium production facility for the cost advantage over highly refined zirconium. The utilization of the alloys of this invention in nuclear applications may necessitate control of high neutron absorption cross section impurities in the alloys.

Several methods can be practiced to produce the alloys disclosed in this invention.

In one practice, the alloy is arc melted in a controlled atmosphere arc melting furnace. Before arc melting, a zirconium bar is cut into pieces of convenient size, with one convenient size weighing about 100 grams. Small holes are drilled into the zirconium pieces for introducing the alloying elements. After introduction of the alloying elements, the sections are pickled in a dilute acid solution followed by rinsing and drying. Before arc melting, the chamber of the arc melting furnace is evacuated and filled with an inert gas such as argon. A metallic getter such as a sacrificial zirconium getter button can be melted in the furnace before melting the sections to clean the atmosphere further. The sections are then melted on first one side, allowed to solidify and then melted on the other side. This procedure is repeated until each alloy is homogeneous, usually about three cycles of melting each side of the section. After arc melting, the resulting alloy buttons can be worked into a foil by heating in an inert atmosphere and rapidly hot-rolled in air to a desired thickness. The sheets of alloy are then cleaned with a typical cycle of sand-blasting, pickling in acid, rinsing in water and drying. If the sheets of alloy are found to be inhomogeneous, the sheets are cut into small pieces, remelted in the arc furnace followed by rapidly hot rolling in air. Where the alloys are too reactive to hot roll in air and an inert atmosphere rolling facility is unavailable, the alloys are clad in copper before hot rolling.

Another method of producing the alloys of this invention is to take a zirconium-titanium sheet material in proportions desired for the resulting alloy and nickel plate the nickel constituent onto the zirconium-titanium alloy. The nickel plated zirconium-titanium alloy is then subjected to a vacuum diffusion process to diffuse the nickel into the zirconium-titanium alloy, a representative process being done at 750° C. Since the diffusion of nickel usually achieves a depth of 0.6 mil in this representative process, thin sheets of the zirconium-titanium alloy are used in this process.

The alloys of this invention have the property of reacting with water and water vapor for long periods at a rapid rate of reaction over a temperature range of about 200° to about 650° C. without becoming passive. One measured rate of reaction was about 1 to about 2 micrograms/square centimeter of surface area per minute at about 300° C. The long term reaction data with water was obtained by heating alloy specimens in contact with water vapor, and the alloy exhibited no passivity for periods of greater than 30 hours. During reaction with water, the alloys allow substantially no release of hydrogen so metallic materials used in association with the alloys of this invention would be exposed to substantially no hydrogen to nucleate metallic hydrides leading to failures of the metallic materials. This minimum release of hydrogen during the reaction of the alloys with water indicates a substantially stoichiometric reaction of the alloys with water. Studies indicate that the alloys of this invention readily react with hydrogen over a temperature range of about 200° to about 650° C. so that the alloys of this invention are efficient hydrogen getters. The alloys also react with hydrogen-containing compounds such as hydrocarbons and with other gases such as nitrogen, carbon dioxide, carbon monoxide and oxygen. Since the alloys are zirconium base alloys the alloys have a low neutron cross section required for use in nuclear applications when the impurities having high neutron cross section are minimized. The alloys can be readily fabricated into shapes having high surface area such as thin sheets.

The properties exhibited by the class of alloys disclosed in this invention enable utilization of the alloys as moisture and gas getters in nuclear fuel rods. Water-free ceramic fuel has been difficult to obtain because of the routine grinding of pellets under water and the exposure of the ceramic fuel to atmospheric humidity during assembly of nuclear fuel rods. Introduction of the alloys disclosed in this invention into nuclear fuel rods provides protection from moisture and from hydriding failures of cladding. The success of these ternary alloys in nuclear fuel rods is attributable to the rapid rate of the stoichiometric reaction of the alloys with water and the fact that substantially no free hydrogen is produced in the reaction.

While the alloys of this invention find a preferred application for controlling moisture in nuclear fuel rods, other applications of the disclosed alloy compositions will be apparent to a person skilled in the art. Another representative application is the use of the disclosed alloys as getters for vacuum systems as the disclosed alloys are operative at temperatures above about 200° C. encountered in the bake-out conditions of most vacuum systems. The ability of the alloys to getter hydrogen is particularly desirable for use in vacuum systems and vacuum devices.

The alloys of this invention serve as scavengers for cleaning inert gas systems. In constant temperature furnaces at modest temperatures, the alloys effectively scavenge all reactive gases from the inert gas. In such service the alloys react with gases such as hydrogen and with moisture at temperatures of about 200° C. or higher. The alloy compositions of this invention could also be used inside inert atmosphere glove boxes or other enclosures being heated by inexpensive heaters such as hot plates to maintain purity of the inert atmosphere and avoid the expense of more complicated gas cleaning equipment.

The invention is further described by the following examples in which all parts are by weight unless otherwise specified. These examples are offered to be illustrative of the invention and do not serve to limit the invention in any manner.

EXAMPLE 1

Alloy Preparation

A metallic zirconium crystal bar was cut to give three sections cylindrical in shape having a diameter of about ¾ inches and a height of about ¼ inches and weighing approximately 100 grams each. Small holes 0.050 inch in diameter were drilled radially in each section. The nickel and titanium alloying elements, in the form of high purity elemental wires, were inserted in the radial holes of each designated section as follows:

| Section Designation | % Titanium (by weight) | % Nickel (by weight) |
| --- | --- | --- |
| Section A | 15 | — |
| Section B | 13 | 5 |
| Section C | — | 10 |

The sections were then pickled in a solution of 50 parts water, 47 parts nitric acid and 3 parts hydrofluoric acid. All sections were then rinsed in water, dried and weighed. The chamber of an arc melting furnace was evacuated to less than $1 \times 10^{-5}$ torr. The chamber had a volume of approximately 10 liters. The chamber was back filled to 0.5 atmosphere with bottled argon, and a getter button of zirconium was melted in the furnace to further clean the atmosphere.

Sections A, B and C were separately introduced to the chamber of the furnace, melted on one side, allowed to solidify, turned over and melted on the other side. This procedure was repeated until each alloy had been melted a total of three times on each side.

The sections were then removed from the arc melting furnace in the form of alloy buttons which were subsequently heated in an argon atmosphere to 1450° F. and then rapidly hot-rolled in air to form sheets, each sheet being approximately 0.035 inch in thickness. Each sheet was sand blasted, pickled in acid, rinsed, dried and cut in small pieces of approximately 0.5 square centimeters. The small pieces of each sheet were ultrasonically cleaned in alcohol, rinsed in distilled water, dried, mixed and remelted in an arc melting furnace to form three separate alloy buttons, again melting three times on each side. After arc melting, each alloy was heated in argon to 1450° F. and rapidly hot rolled in air to approximately 0.035 inch in thickness. The alloy resulting from section B was clad in copper before each hot rolling step to prevent oxidation. The finished alloys were foils having the following compositions: A—84.6% zirconium and 15.4% titanium; B—84.6% zirconium, 11.3% titanium and 4.1% nickel; C—90.3% zirconium and 9.7% nickel.

EXAMPLE 2

Alloy Preparation

A sheet of 84.6% zirconium and 15.4% titanium was prepared by arc melting as in Example 1. The sheet was then electroplated with nickel so that a layer of 12% by weight nickel was deposited on the sheet. The nickel was next vacuum diffused into the alloy sheet at 750° C. for 60 hours in an argon atmosphere. This process gave an alloy of 75.0% zirconium, 13.4% titanium and 11.6% nickel.

EXAMPLE 3

Weighed samples of alloy getter foils prepared as in Examples 1 and 2 and designated below by composition are placed into a cold Pyrex ® retort, and the retort is evacuated to a pressure less than $10^{-2}$ torr. The retort is sealed from the atmosphere and heated to a temperature range listed in Table 1 below as measured by a thermocouple having leads of platinum and platinum—10% rhodium positioned inside the retort adjacent the samples. Water vapor is admitted to the retort and maintained at 12 torr by keeping the retort in contact with vapor from a water bath maintained at about 14° C. The extent of reaction is measured by periodically evacuating and isolating the retort, cooling the retort to room temperature, removing the samples from the retort and weighing the samples. After weighing, the samples are again placed in the retort, the retort is evacuated and sealed from the atmosphere and the samples are again exposed to water vapor. While the reaction is in progress the composition of the atmosphere in the retort is continuously monitored by mass spectrometry. This procedure provides a measurement of the weight gained by the samples, the rate of weight gained by the samples, and the amount of hydrogen evolved during the reaction of the samples and water vapor. The results of testing each sample are presented in Table 1.

EXAMPLE 5

The reaction between air at an initial pressure of 9.6 torr and a ternary alloy of approximately 75 Zr—13 Ti—12 Ni was studied at a temperature of 330° C.±15° C. using the apparatus of FIG. 3. The alloy specimen had a surface area of 16.12 cm$^2$. The reaction was allowed to proceed for 144 minutes during which the partial pressures of nitrogen, oxygen, argon and carbon dioxide were monitored as well as the total pressure. All pressures except the argon pressure decreased with time. The oxygen and carbon dioxide pressure were

TABLE 1

| Alloy | Temp. Range | Extent of Corrosion $\mu$ grams/cm$^2$ | Wt. % | Average Linear Rate of Wt. Gained in $\mu$ grams/Cm$^2$-min. | % of Corrosion Hydrogen Retained by Alloy | Fraction of Corrosion Hydrogen Released as Free Hydrogen |
|---|---|---|---|---|---|---|
| 84.6 Zr-15.4 Ti | 320°–340° C. | 361 | 0.49 | 5 | * | * |
| 84.6 Zr-11.3 Ti-4.1 Ni | 290°–310° C. | 6310 | 7.1 | 0.5 | 100 | $10^{-3}$ |
| 90.3 Zr.-9.7 Ni | 425°–500° C. | 336 | 0.42 | 5** | 100 | $5 \times 10^{-4}$ |
| 75 Zr-13.4 Ti-11.6 Ni | 330°–345° C. | 485 | 0.46 | 2 | 99 | $10^{-4}$ |

*This alloy was not a consistant hydrogen getter over the 200°–650° C. temperature range studied. The fraction of corrosion hydrogen retained at 320° C. was about 15%. Temperatures in excess of 418° C. were required before 100% corrosion hydrogen was retained.
**The average linear rate of weight gained at 290° C. was less than about $10^{-2}$ micrograms/cm$^2$-minutes.

The reaction rates of the titanium-containing alloys were sufficiently rapid for water gettering during nuclear reactor start-up. Of the three alloys containing titanium only the ternary alloys (Zr-Ti-Ni) produced negligible hydrogen during the reaction with water at all temperatures studied.

EXAMPLE 4

The reaction between hydrogen and an alloy of 75 Zr—13 Ti—12 Ni was studied over the temperature range of 235° to 316° C. by using the apparatus of Example 3 and substituting hydrogen for the water vapor introduced in the retort in Example 3. The specimen had a surface area of 12.81 cm$^2$ and was heated in the evacuated furnace chamber to the foregoing temperature range before introduction of hydrogen. The rate of hydrogen pressure drop was observed at five temperatures throughout the foregoing range, and the rate of reaction was determined to range from approximately 0.009 micrograms hydrogen/cm$^2$-minute at 235° C. to 0.40 micrograms hydrogen/cm$^2$-minute at 316° C. The rate was found to increase slightly with time at a given temperature. These rates of reaction of the alloy would remove hydrogen at a sufficient rate for the alloy to be utlized as a hydrogen getter in numerous applications.

reduced to the minimum level of detection (about 0.02 torr) after 144 minutes. The nitrogen pressure decreased from 7.4 to 5.9 torr over the same period. The specimen weighed 0.476 grams before reaction and gained about 1.03 mg from the reaction. Chemical analysis showed an oxygen gain of about 0.67 mg and a nitrogen gain of about 0.36 mg.

As will be apparent to those skilled in the art, various modifications and changes may be made in the invention described herein. It is accordingly the intention that the invention be construed in the broadest manner within the spirit and scope as set forth in the accompanying claims.

What is claimed is:

1. A getter alloy having the essential components of zirconium, nickel and titanium comprised of about 4 weight percent nickel, about 11 weight percent titanium, and the balance being zirconium, said alloy being capable of reacting with water, water vapor, hydrogen, carbon monoxide, carbon dioxide, oxygen and hydrocarbons.

2. A getter alloy having the essential components of zirconium, nickel and titanium comprised of about 12 weight percent nickel, about 13 weight percent titanium and the balance being zirconium, said alloy being capable of reacting with water, water vapor, hydrogen, carbon monoxide, carbon dioxide, oxygen and hydrocarbons.

* * * * *